United States Patent [19]

Krome, Jr.

[11] 4,365,964

[45] Dec. 28, 1982

[54] COMBINATION COUPLING AND SHEAVE

[75] Inventor: Edward F. Krome, Jr., Columbus, Ind.

[73] Assignee: Reliance Electric Company, Columbus, Ind.

[21] Appl. No.: 201,734

[22] Filed: Oct. 29, 1980

[51] Int. Cl.³ ............................................. F16H 11/04
[52] U.S. Cl. ...................................... 474/28; 474/903
[58] Field of Search ......................... 474/8, 18, 28, 903; 64/13; 403/371; 308/237 A; 464/80

[56] References Cited

U.S. PATENT DOCUMENTS

| | | | |
|---|---|---|---|
| 2,269,821 | 1/1942 | Kemphert et al. | 474/903 |
| 2,857,771 | 10/1958 | McCloskey | 74/230.17 |
| 3,324,736 | 6/1967 | Bassoff | 74/230.17 |
| 3,888,093 | 6/1975 | Downey | 464/80 |
| 4,089,232 | 5/1978 | Llach et al. | 474/28 |

FOREIGN PATENT DOCUMENTS

| | | | |
|---|---|---|---|
| 6503082 | 9/1965 | Netherlands | 403/371 |
| 705443 | 3/1954 | United Kingdom | 474/8 |

Primary Examiner—Kenneth Dorner
Assistant Examiner—Charles M. Wall
Attorney, Agent, or Firm—Marmaduke A. Hobbs

[57] ABSTRACT

A combination coupling and sheave in a variable speed belt drive in which a variable pitch sheave has a fixed flange, an axially shiftable flange and a shaft connected to the drive motor by a flexible coupling with the hubs thereof secured to the motor and sheave shaft. The inventive concept includes mounting the coupling hub on the sheave shaft in a bearing of a pillow block at the end of the shaft and connecting the fixed flange of the sheave to the hub, so that the fixed flange is driven directly by the hub rather than solely by the shaft, and the slidable flange is driven through the shaft, thus creating split power paths between the flexible coupling and the fixed flange and between the coupling and the slidable flange through the sheave shaft, thereby reducing the load on the operating parts of the sheave.

11 Claims, 4 Drawing Figures

U.S. Patent  Dec. 28, 1982  Sheet 1 of 2  4,365,964
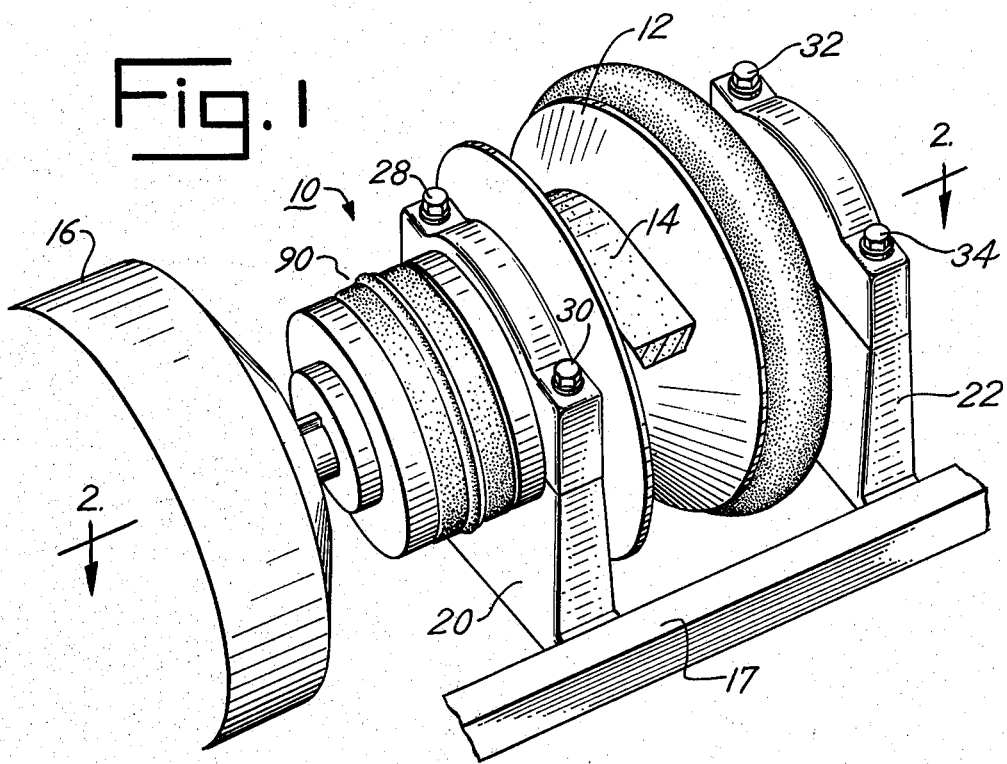
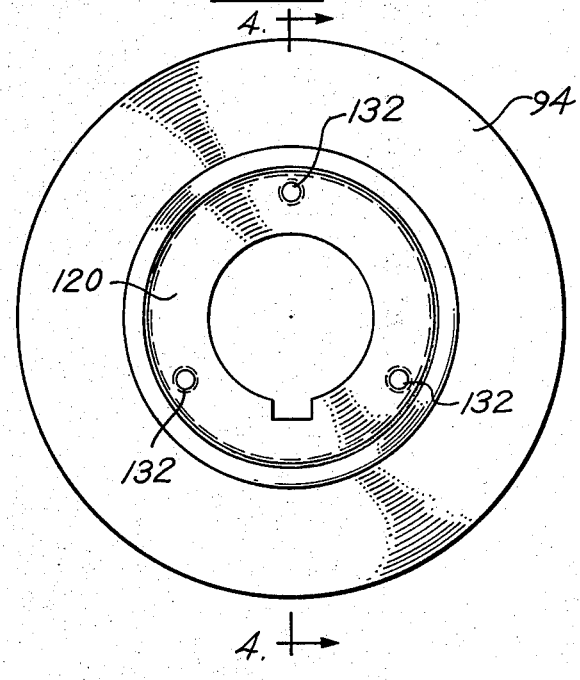
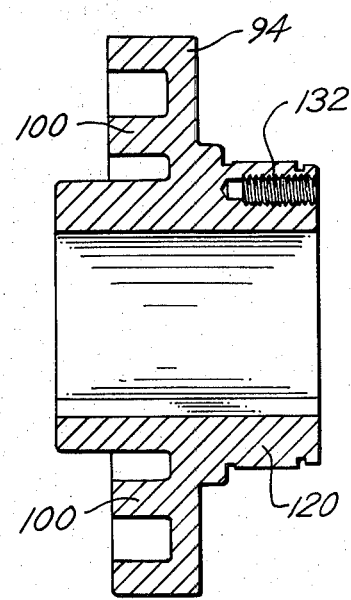

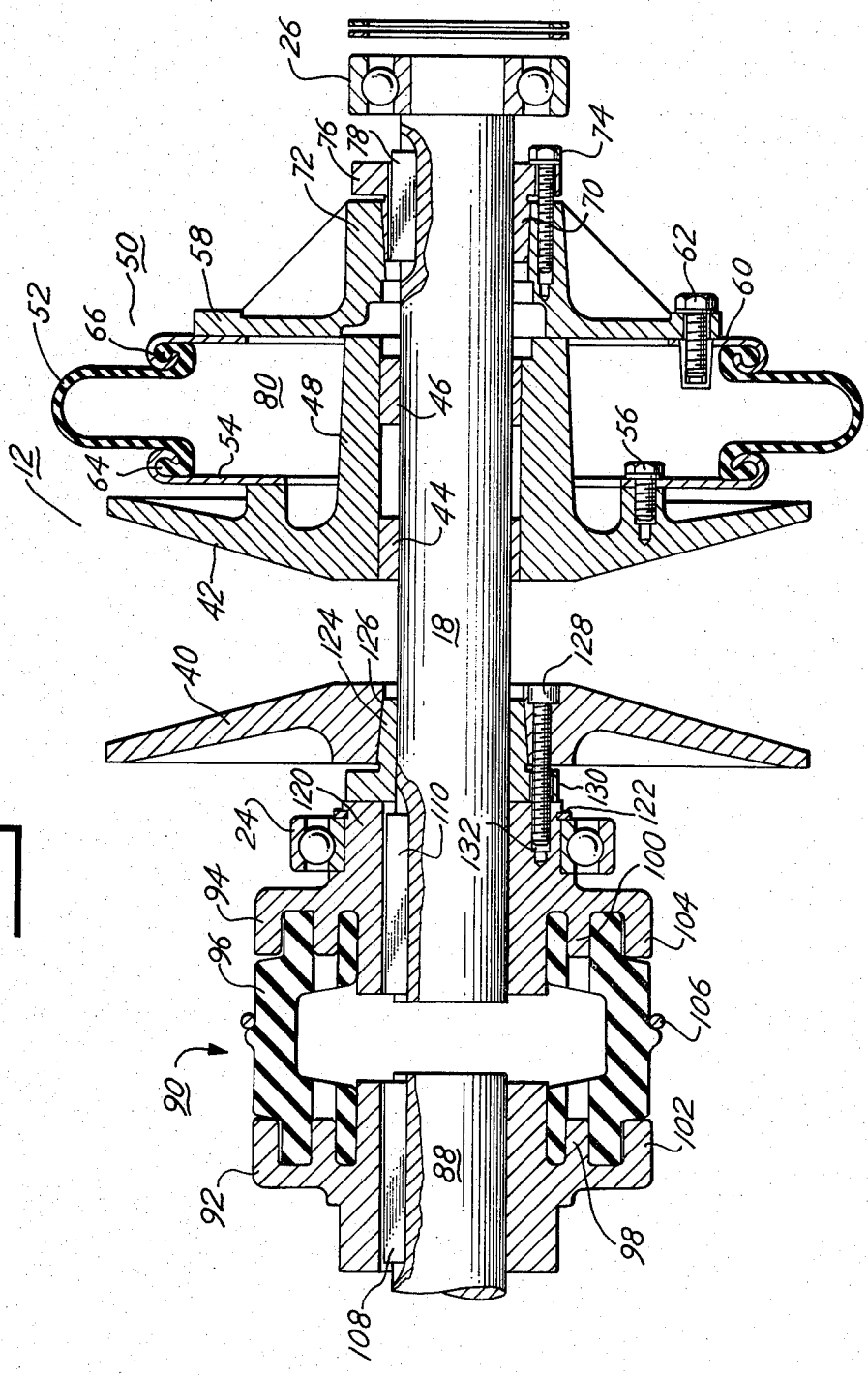

COMBINATION COUPLING AND SHEAVE

BACKGROUND OF THE INVENTION

Variable speed belt drives normally have two variable pitch driven sheaves wherein one of the flanges of each sheave is mounted on and fixed to a shaft and the other of the flanges is slidable on the shaft toward and away from the fixed flange to vary the pitch and hence change the output speed of the drive. In conventional sheaves of this type, the two flanges of the drive sheave are keyed to the shaft and the torque from the motor is transmitted through the shaft and key to the two flanges, and in most drives the shaft is connected directly to and supported by the shaft of the drive motor; however, in some variable speed drives the shaft of the drive sheave is journaled in pillow blocks at the ends and is connected to the motor shaft by a coupling. The sheave and motor shafts may be connected by a flexible coupling having flanges mounted on the two shafts in spaced end-to-end relation and connected by a flexible torsion element which compensates for minor misalignment between the two shafts. This type of shaft connection requires a substantial amount of space in order to assemble the two shafts and the coupling beyond and in spaced relation to the pillow block, thus making the overall size of the drive relatively large and occasionally too large for a particular installation or application, such as in air conditioner housings and similar equipment.

An alternative to the drive coupling and shaft assembly described above is a direct system in which the sheave shaft is connected directly to and supported by the motor shaft; however, this system has the disadvantage of being extremely difficult to obtain satisfactory shaft alignment, including alignment between the motor mounted constant speed shaft of the drive sheave and the separately mounted shaft of the variable speed sheave. These two shafts must be made parallel and square between the belt and sheave in three planes within very close tolerances, after the parts are installed in the machine to be driven. Since precise and reliable test equipment for making satisfactory shaft alignment, and the expertise and the time required to make proper alignment and adjustments, are rarely available at the installation site, these direct motor driven drives basically have a short belt and sheave life resulting from misalignment.

SUMMARY OF THE INVENTION

One of the principal objects of the present invention is to provide a combination power input coupling and sheave, in which the shafts of the drive can be accurately aligned in production and this alignment maintained during installation and in operation of the drive without further adjustment, thus eliminating belt and shaft alignment during on-site installation, and which makes possible the construction of a more compact variable speed drive unit than is possible with the conventional drive structure, wherein the drive shaft is connected directly to and supported by the motor shaft.

Another object of the invention is to provide a combination power input coupling and sheave, in which the constant speed shaft of the drive sheave and the variable speed shaft of the driven sheave can be readily and reliably made parallel with one another and square with the belt without adhering to close tolerances, and which can be completely aligned in all three planes in manufacture of the drive without any adjustments being required during installation.

Still another object is to provide a variable speed belt drive of the aforesaid type, in which split power paths from the motor to the two flanges of the drive sheave are obtained to minimize the load on the individual parts of the sheave, and which is so constructed and designed that it can be easily fabricated, and assembled in production, and thereafter conveniently serviced in the field, if required, without the use of sophisticated test equipment or highly skilled service personnel.

A further object of the invention is to provide a combination power input coupling and drive sheave for a variable speed drive, which is so constructed and designed that it will provide optimum performance under long continued operation and under adverse operating conditions, such as heavy load and frequent changes in load and in variation in output speed of the drive.

These and other objects are achieved by the present invention, which relates to a variable speed drive having variable pitch sheaves with a fixed flange, an axially shiftable flange, and a shaft connected to the drive motor by a flexible coupling with hubs thereof secured to the motor and sheave shafts. The inventive concept includes mounting the coupling hub of the sheave shaft in a bearing of a pillow block at the motor end of the shaft and connecting the fixed flange of the sheave to the hub, so that the fixed flange is driven directly by the hub rather than solely through the shaft. The slidable flange, on the other hand, is driven solely through the shaft. This creates split power paths between the flexible coupling and the fixed flange and between the coupling and slidable flange through the sheave shaft, thereby reducing the load on the operating parts of the sheave. This coupling and sheave combination system can be used, if desired, on the output sheave, wherein the fixed flange is connected to a coupling flange in the bearing of a pillow block and the slidable flange is connected directly to the sheave shaft, thus also providing a split power path system on the output side of the drive.

BRIEF DESCRIPTION OF THE DRAWINGS

FIG. 1 is a perspective view of the motor and drive sheave of a variable speed belt drive, embodying the present invention;

FIG. 2 is a horizontal cross sectional view of the motor and drive sheave shown in FIG. 1, the section being taken on line 2—2 of the latter figure;

FIG. 3 is an end elevational view of one end of one of the flanges of the coupling for the motor and sheave shaft; and FIG. 4 is a vertical cross sectional view of the coupling flange shown in FIG. 3, the section being taken on line 4—4 of the latter figure.

DESCRIPTION OF THE PREFERRED EMBODIMENT

Referring more specifically to the drawings, and to FIG. 1 in particular, numeral 10 indicates generally the motor and drive sheave assembly of a variable speed belt drive which includes, in addition to the drive assembly, the driven assembly having a variable speed sheave and an output shaft connected to the drive sheave 12 by a wide V-belt 14. The drive sheave is driven by a motor 16 mounted on a base or frame 17 which supports not only the motor but also the drive sheave and the driven sheave, so that the motor, drive shaft and driven shaft are essentially a single unit.

The drive sheave 12 has a shaft 18 journaled in pillow blocks 20 and 22, the two pillow blocks having bearings 24 and 26, respectively, which are seated in the pillow block and are secured therein between the lower and upper halves of the pillow block and by screws 28 and 30 of pillow block 20 and screws 32 and 34 of pillow block 22. The sheave has a fixed flange 40 and an axially slidable flange 42. In order to facilitate axial sliding of the flange 42 on shaft 18, graphite bearings 44 and 46 are disposed in hub 48 of the flange. Flange 42 is moved to various positions along the shaft for obtaining various preselected speeds of the drive, by a pneumatic operated coupling indicated generally by numeral 50. This coupling is disclosed and claimed in co-pending application Ser. No. 183,627, filed Sept. 2, 1980, common assignee, and consists of the flexible torsion element 52 connected to a plate 54 which in turn is connected by screws 56 to flange 42 on one side and on the other side is connected to a flange 58 and a ring or plate 60 secured together by a plurality of spaced screws 62. The torsion element may be secured to the two plates 54 and 60 by beads 64 and 66 or by any other suitable securing means on opposite edges of the element. Flange 58 is connected rigidly to the shaft by a tapered bushing 70 seating on a corresponding tapered surface in hub 72, the two tapered surfaces being forced together by a plurality of screws 74 extending through shoulder or flange 76 of the bushing into the respective end of hub 72. The bushing is keyed to the shaft by a key 78. The axial position of sheave flange 42 is controlled by the pressure of the fluid in chamber 80 which is transmitted from a control source through passages in shaft 18 from the right hand end of the shaft, as viewed in FIG. 2. As the pressure is increased in chamber 80, the flange is moved to the left, thereby forcing the belt radially outwardly and, as the pressure in the chamber is reduced, the belt pressure on flanges 40 and 42 urges flange 42 to the right, thus varying the pitch of the sheave to satisfy the required speed output of the variable speed belt drive. Further details of the mechanism for varying the position of flange 42 will not be discussed herein, in that the present invention does not directly involve this part of the drive.

Shaft 18 is connected to shaft 88 of motor 16 by a flexible coupling, indicated generally by numeral 90, having flange 92 secured to the motor shaft and a flange 94 secured to shaft 18. The two flanges 92 and 94 are connected to one another by a torsion element 96 of rubber or other suitable flexible material. The coupling 90 is fully described and covered by U.S. Pat. No. 3,888,093, and hence some details of the coupling will not be described herein; however, torsion element 96 is connected to flanges 92 and 94 by a plurality of spaced pins 98 and 100 on the two flanges, respectively, and is retained firmly in place by laterally extending flanges 102 and 104 of flanges 92 and 94, respectively. A restraining ring 106 is preferably used to restrict the radial deflection resulting from a centrifugal force of the coupling during operation of the drive.

The flanges 92 and 94 are secured to the respective shafts and prevented from rotating relative thereto by keys 108 and 110. Flange 94 has a hub 120 which extends into the pillow block and is journaled in bearing 24, with the bearing and hub being held together by a snap ring 122 seated in a groove in hub 120. When the hub and bearing are assembled, the inner race of the bearing rotates with the hub and the outer race remains in fixed position in the pillow block. Thus hub 120 forms a rotating support member for shaft 18. Flange 40 is secured directly to hub 120 by a tapered bushing 124 seated on a tapered surface 126 in the center bore of flange 40. The bushing has an axial split therethrough which permits it to contract onto the shaft as the flange is assembled on the bushing, by a plurality of Allen head screws 128 extending through flange 40 and through shoulder or flange 130 of bushing 124 into threaded bores 132 in hub 120 of coupling flange 94. When the screws 128 are fully tightened, a solid connection is created between hub 120, bushing 124 and flange 40. It is seen from the foregoing that the torque from the motor is transmitted through coupling 90, hub 120 and bushing 124 directly to flange 40, and from coupling 90 through fluid controlled mechanism 50 to flange 42, the latter flange being adapted to slide axially on the shaft in response to the operation of mechanism 50.

In the use and operation of the present combination coupling and sheave, with the parts assembled in the manner illustrated in FIG. 2, a solid connection is provided between hub 120 and flange 40. After the mechanism 50 and flange 42 have been assembled on shaft 18, two separate power paths are created between the coupling 90 and flange 40 on the one hand, and coupling 90 and flange 42 on the other hand, the first power path being through hub 120 of flange 94 and bushing 124 to flange 40, and the second being from flange 94 through hub 120, key 110, shaft 18, key 78 and hub 72 of flange 58 to the torsion element 52, and thence through plate 54 to flange 42. These separate power paths to the two flanges make it possible to transmit the force without placing any substantial strain on various parts, thus permitting smaller and lighter parts to be used in the sheave assembly. The foregoing construction renders the assembly of the drive sheave and motor more compact than the conventional or standard structures, as well as improving the reliability of the drive and assisting in maintaining proper alignment between sheave shafts and the belt on the two sheaves. Since the alignment and adjustments are made in the manufacturing plant, where the equipment for obtaining accurate alignment is normally readily available, the drive is placed in optimum operating condition, and the alignment and other adjustments need not be disturbed during installation, thus providing satisfactory operation of the sheave over extended periods of operation.

While the combination coupling and sheave for variable speed belt drives has been described with reference to the power input side, the structure disclosed herein can be used satisfactorily in connection with the driven sheave and the coupling to the equipment driven by the variable speed drive. This system, when used on the driven sheave having fixed and axially slidable flanges, provides a separate power path between the two flanges of the driven sheave and the output coupling, in a manner similar to that described with reference to the drive sheave and input coupling from the motor.

While only one embodiment of the present combination input coupling and sheave has been described in detail herein, various changes and modifications may be made without departing from the scope of the invention.

I claim:

1. Combination coupling and sheave in a variable speed belt drive, comprising a variable pitch sheave having a shaft, an axially slidable flange mounted on said shaft and a fixed flange in axial relationship with said slidable flange, bearings at each end of said shaft, a coupling connected to said shaft and having a hub journaled in one of said bearings and having an end facing said fixed flange, a means for securing said hub to said shaft, and means extending generally parallel with said shaft for securing said fixed flange to said end of said hub for rotation therewith.

2. Combination coupling and sheave as defined in claim 1 in which said fixed flange has a tapered center bore therein and a split tapered bushing is secured to said end of said hub and extends into said tapered bore, and screws extend through said flange and bushing and into the said end of said hub to form a solid connection between said hub and fixed flange.

3. Combination coupling and sheave as defined in claim 1 in which said hub and shaft have complementary key ways, and a key is disposed in said key ways for connecting said hub to said shaft.

4. Combination coupling and sheave as defined in claim 2 in which said hub and shaft have complementary key ways, and a key is disposed in said key ways for connecting said hub to said shaft.

5. Combination coupling and sheave as defined in claim 1 in which said coupling includes a flange connected to said hub, a hub for connecting said coupling to a second shaft, a second flange connected to said last mentioned hub, and a torsion element extending between said coupling flanges for transmitting torque between said two coupling flanges to said first mentioned hub.

6. Combination coupling and sheave as defined in claim 2 in which said coupling includes a flange connected to said hub, a hub for connecting said coupling to a second shaft, a second flange connected to said last mentioned hub, and a torsion element extending between said coupling flanges for transmitting torque between said two coupling flanges to said first mentioned hub.

7. Combination coupling and sheave as defined in claim 1 in which the bearing containing said hub is a pillow block including a ball bearing in which said hub is journaled.

8. Combination coupling and sheave as defined in claim 1 in which means is included for interconnecting said shaft and slidable flange for driving said slidable flange, and means is provided for adjusting said slidable flange axially on said shaft relative to said fixed flange.

9. Combination coupling and sheave as defined in claim 6 in which means is included for interconnecting said shaft and slidable flange for driving said slidable flange, and means is provided for adjusting said slidable flange axially on said shaft relative to said fixed flange.

10. Combination coupling and sheave as defined in claim 2 in which said tapered bushing has an annular flange which seats on said end of said hub, and said screws extend through said bushing flange into said hub.

11. Combination coupling and sheave as defined in claim 4 in which said tapered bushing has an annular flange which seats on said end of said hub, and said screws extend through said bushing flange into said hub.

* * * * *